United States Patent [19]
Ayerst et al.

[11] Patent Number: 5,712,624
[45] Date of Patent: Jan. 27, 1998

[54] METHOD AND APPARATUS FOR OPTIMIZING RECEIVER SYNCHRONIZATION IN A RADIO COMMUNICATION SYSTEM

[75] Inventors: Douglas I. Ayerst, Delray Beach; Leo G. Dehner, Jr., Coconut Creek, both of Fla.

[73] Assignee: Motorola, Inc., Schaumburg, Ill.

[21] Appl. No.: 398,274

[22] Filed: Mar. 3, 1995

[51] Int. Cl.[6] ........................................ H04Q 7/18
[52] U.S. Cl. ........................ 340/825.21; 340/825.14; 340/825.44; 370/509; 375/362; 375/368; 455/265
[58] Field of Search .................. 340/311.1, 825.14, 340/825.2, 825.21, 825.44, 825.47, 825.52, 825.68, 825.69; 370/103, 509; 375/362, 368; 379/56, 57; 455/31.1, 38.1, 57.1, 265

[56] References Cited

U.S. PATENT DOCUMENTS

| | | | |
|---|---|---|---|
| 4,961,073 | 10/1990 | Drapac et al. | 340/825.44 |
| 5,325,088 | 6/1994 | Willard et al. | 340/825.2 |
| 5,463,382 | 10/1995 | Nikas et al. | 340/825.44 |
| 5,495,233 | 2/1996 | Kawashima et al. | 340/825.44 X |
| 5,497,145 | 3/1996 | Yung et al. | 340/825.44 |
| 5,512,886 | 4/1996 | Macko et al. | 340/825.44 X |
| 5,537,685 | 7/1996 | Matsuno | 455/51.1 |

FOREIGN PATENT DOCUMENTS

| | | | |
|---|---|---|---|
| 89/06407 | 7/1989 | WIPO | 340/825.44 |

*Primary Examiner*—Michael Horabik
*Assistant Examiner*—William H. Wilson, Jr.
*Attorney, Agent, or Firm*—James A. Lamb

[57] ABSTRACT

A fixed system receiver (107) operates in a synchronization mode which is one of a synchronous mode and an asynchronous mode. A system controller (102) transmits a response command which includes a preamble indicator corresponding to the synchronization mode of the fixed system receiver (107). A selective call radio (106) receives and decodes the preamble indicator and generates a response message data unit (312). The synchronous header data packet (660) is preceded by a synchronizing packet (650) when the preamble indicator indicates the asynchronous mode and is not preceded by the synchronizing packet (650) when the preamble indicator indicates the synchronous mode. The selective call radio (106) transmits the response message data unit (312). The fixed system receiver (107) acquires symbol recovery timing and synchronizes to data packet boundaries of the response message data unit (312), using the synchronizing packet (650) when included.

11 Claims, 7 Drawing Sheets

METHOD AND APPARATUS FOR OPTIMIZING RECEIVER SYNCHRONIZATION IN A RADIO COMMUNICATION SYSTEM

FIELD OF THE INVENTION

This invention relates in general to synchronizing fixed system receivers used in radio communication systems, and in particular to using an optimum synchronizing preamble with an inbound data packet transmitted by a selective call radio in a radio communication system having both synchronous and asynchronous fixed system receivers.

Background of the Invention

In a data communication system it is typically desirable to use the shortest possible synchronization preamble for a data packet which is consistent with some predetermined reliability criteria for transmitting data packets, in order to maximize the throughput of data packets in the system.

In a radio communication system having a plurality of mobile and/or portable selective call radios communicating to one or more fixed system receivers, such as a paging system having two way pagers which generate response messages, protocols for data packets sent from the two way pagers to the fixed system receivers, can typically be synchronous or asynchronous. In a system using an asynchronous protocol, the fixed system receiver is not synchronized to the two way pagers, and a synchronous preamble which is sufficiently long to establish both data packet boundaries and data symbol synchronization must be included in a data packet to have a reasonable probability of receiving the data packet. On the other hand, in a synchronous system, both the fixed system receiver and the two way pager are synchronized to a common standard, and data packets used for responses can eliminate all, or almost all synchronization bits.

Systems which include two way pagers can operate on one radio frequency, which then must be time division duplexed between the outbound channel (used to transmit from a central controller to a two way pager) and the inbound channel (used to transmit from the two way pager to a fixed system receiver, thence to the central controller). In a two frequency system, each frequency is typically dedicated to one of the inbound and outbound channels. Many systems are designed as two frequency systems at the time of installation, but because synchronous fixed system receivers are more complicated and costly in a radio communication system, it is desirable to be able to install a new two frequency system using asynchronous fixed system receivers, and then gradually upgrade them to synchronous receivers later. In this situation, an asynchronous data packet can be used for all inbound messages until all fixed system receivers are converted to synchronous receivers. This, however, does not optimize the length of inbound message packets when the system has a mixture of both synchronous and asynchronous fixed system receivers.

Thus, what is needed is a technique for optimizing the synchronizing preambles of inbound data packets in a radio communication system having both synchronous and asynchronous fixed system receivers.

SUMMARY OF THE INVENTION

Accordingly, in a first aspect of the present invention, a method used in a radio communication system optimizes a fixed system receiver synchronization. The radio communication system has a fixed system receiver which operates in a synchronization mode which is one of a synchronous mode and an asynchronous mode. A response message data unit having a synchronous header data packet is transmitted by a selective call radio and received by the fixed system receiver.

In a system controller the method includes the step of transmitting a response command which includes a preamble indicator corresponding to the synchronization mode of the fixed system receiver. In a selective call radio the method includes the steps of receiving and decoding; generating; and transmitting. In the step of receiving and decoding, the selective call radio receives and decodes the response command including the preamble indicator. In the step of generating, the selective call radio generates the response message data unit having a data rate. The synchronous header data packet is preceded by a synchronizing packet when the preamble indicator indicates the asynchronous mode and is not preceded by the synchronizing packet when the preamble indicator indicates the synchronous mode. In the step of transmitting, the selective call radio transmits the response message data unit. In the fixed system receiver the method includes a step of acquiring symbol recovery timing and synchronizing the fixed system receiver to data packet boundaries of the response message data unit, using the synchronizing packet, when the fixed system receiver is in the asynchronous mode and the synchronizing packet and synchronous header are received. In the fixed system receiver the method further includes a step of receiving the response message data unit.

Accordingly, in a second aspect of the present invention, a method used in a selective call radio optimizes a fixed system receiver synchronization. The selective call radio operates in a radio communication system. The radio communication system has a fixed system receiver which operates in a synchronization mode which is one of a synchronous mode and an asynchronous mode. A response message data unit having a synchronous header data packet is transmitted from the selective call radio to the fixed system receiver. The method includes the steps of receiving a response command which includes a preamble indicator corresponding to the synchronization mode of the fixed system receiver; decoding the preamble indicator; generating the response message data unit; and transmitting the response message data unit. In the step of generating the response message data unit, the selective call radio appends a synchronizing packet preceding the synchronous header data packet when the preamble indicator indicates the asynchronous mode and does not append the synchronizing packet when the preamble indicator indicates the synchronous mode.

Accordingly, in a third aspect of the present invention, a selective call radio for use in a radio communication system optimizes a fixed system receiver synchronization. The radio communication system has a fixed system receiver which operates in a synchronization mode which is one of a synchronous mode and an asynchronous mode. A response message data unit having a synchronous header data packet is transmitted from the selective call radio to the fixed system receiver. The selective call radio includes a receiver, a decoder element, a selective call address element, a response element, and a transmitter.

The receiver receives a selective call address associated with a response command which includes a preamble indicator corresponding to the synchronization mode of the fixed system receiver. The decoder element is coupled to the receiver and recovering the selective call address. The selective call address element is coupled to the decoder element and generates a message received signal when the selective call address compares to an embedded address stored in the selective call radio. The decoder element responds to the message received signal by recovering the response command. The response synchronization control element is coupled to the decoder element and decodes the preamble indicator. The response element is coupled to the response synchronization control element and generates, in response to the preamble indicator, the response message data unit. The synchronous header data packet is preceded by a synchronizing packet when the preamble indicator indicates the asynchronous mode and is not preceded by the synchronizing packet when the preamble indicator indicates the synchronous mode. The transmitter is coupled to the response element and transmits the response message data unit.

Accordingly, in a fourth aspect of the present invention, a method used in a fixed system receiver of a radio communication system optimizes a fixed system receiver synchronization. The fixed system receiver operates in a synchronization mode which is one of a synchronous mode and an asynchronous mode. A response message data unit having a synchronous header data packet transmitted by a selective call radio is received by the fixed system receiver. The method includes steps of acquiring and synchronizing; adjusting; and receiving. In the step of acquiring and synchronizing, the fixed system receiver acquiring symbol recovery timing and synchronizing the fixed system receiver to data packet boundaries of the response message data unit, using the synchronizing packet, when the fixed system receiver is in the asynchronous mode and the synchronizing packet and synchronous header are received. In the step of adjusting, the fixed system receiver adjusts the symbol recovery timing of the fixed system receiver to the data rate of the selective call radio, using the synchronous header data packet, when the fixed system receiver is in the synchronous mode and the synchronous header data packet is received and the synchronizing packet is not received. In the step of receiving, the fixed system receiver receives the response message data unit.

Accordingly, in a fifth aspect of the present invention, a fixed system receiver used in a radio communication system optimizes a fixed system receiver synchronization. The fixed system receiver operates in a synchronization mode which is one of a synchronous mode and an asynchronous mode. A response message data unit having a synchronous header data packet transmitted by a selective call radio is received by the fixed system receiver. The fixed system receiver includes a synchronization section, a receiver, and a decoder. The synchronization section acquires symbol recovery timing and synchronizes the fixed system receiver to data packet boundaries of the response message data unit, using the synchronizing packet, when the fixed system receiver is in the asynchronous mode and the synchronizing packet and synchronous header are received. The synchronization adjusts the symbol recovery timing of the fixed system receiver to the data rate of the selective call radio, using the synchronous header data packet, when the fixed system receiver is in the synchronous mode and the synchronous header data packet is received and the synchronizing packet is not received. The receiver is coupled to the synchronization section and receives the response message data unit. The decoder is coupled to the synchronization section and decodes the response message data unit.

DETAILED DESCRIPTION OF THE DRAWINGS

Figure 1:
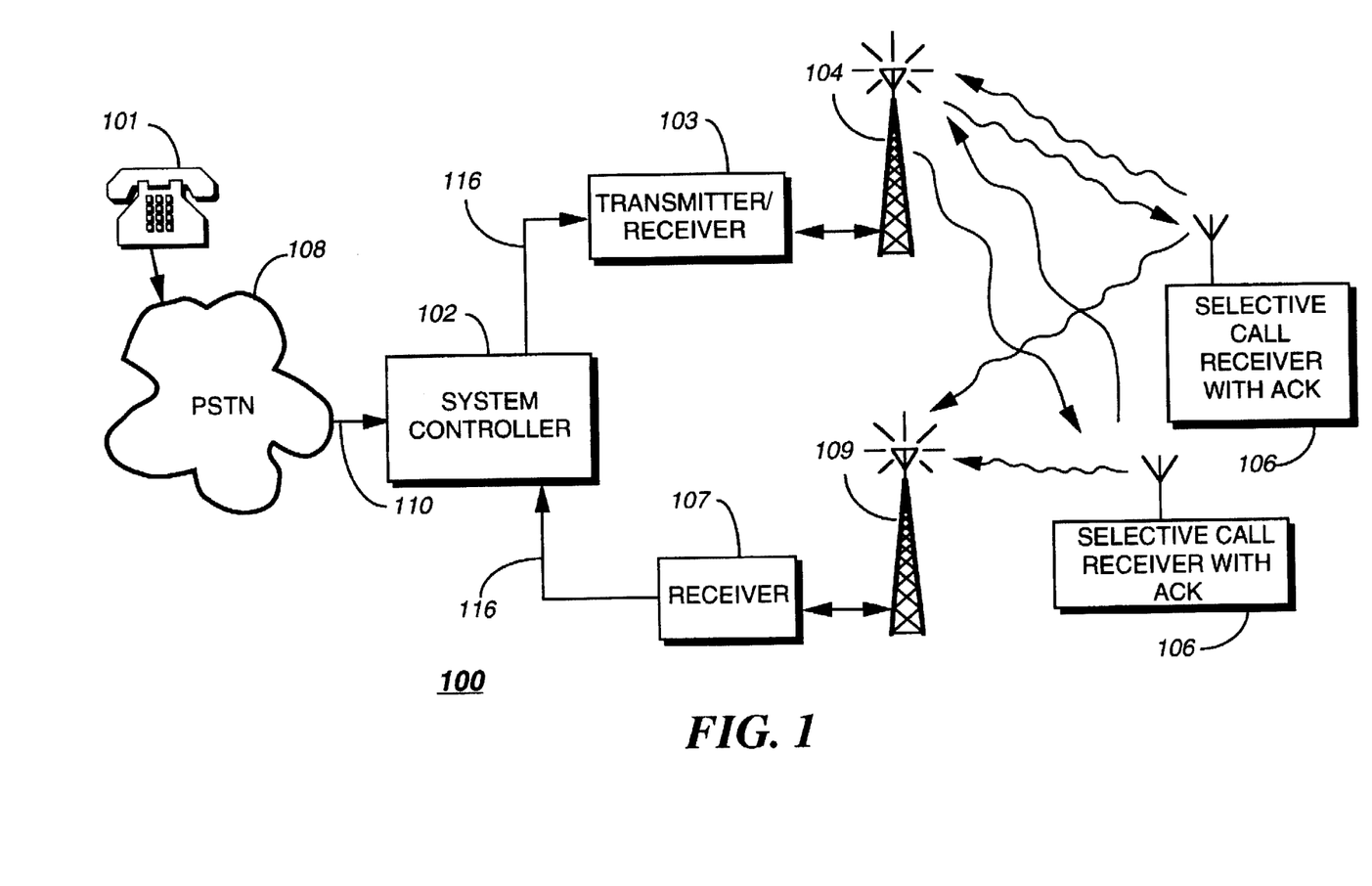
FIG. 1 is an electrical block diagram of a radio communication system, in accordance with a preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101 connected through a conventional switched telephone network (PSTN) 108 by conventional telephone links 110 to a system controller 102. The system controller 102 oversees the operation of at least one radio frequency transmitter/receiver 103 and at least one fixed system receiver 107, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, and response commands, for transmission by the radio frequency transmitter/receivers 103 to a plurality of selective call radios 106. The system controller 102 further functions to decode inbound messages, including unsolicited and response messages, received by the radio frequency transmitter/receivers 103 and the fixed system receivers 107 from the plurality of selective call radios 106.

Examples of response messages are acknowledgments and designated response messages. Designated response messages are communicated in the inbound channel in portions named data units. An acknowledgment is a response to an outbound message initiated at the system controller 102. An example of an outbound alphanumeric message intended for a selective call radio 106 is a page message entered from the telephone 101. The acknowledgment indicates successful reception of the outbound message. A designated response message is a message sent from a selective call radio in response to a command included in an outbound message from the system controller 102. An example of a designated response message is a message initiated by the selective call radio 106, but which is not transmitted until after a response command is received from the system controller 102. The response command, in turn, is sent by the system controller 102 after an inbound message requesting permission to transmit the designated response message is communicated from the selective call radio 106 to the system controller 102. The response messages are preferably transmitted at a time designated within the outbound message or response command, but alternatively can be transmitted using a non-scheduled protocol, such as the ALOHA or slotted ALOHA protocol, which are well known to one of ordinary skill in the art.

An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a designated response and can include data such as alphanumeric, fax, or digitized voice data. Unsolicited messages are transmitted using an ALOHA or slotted ALOHA protocol. The outbound messages are included in outbound radio signals transmitted from a conventional antenna 104 coupled to the radio frequency transmitter/receiver 103. The inbound messages are included in inbound radio signals received by the conventional antenna 104 coupled to the radio frequency transmitter/receiver 103 and the conventional antenna 109 coupled to the fixed system receiver 107.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, 109, and fixed system receivers 107, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 collocated with a conventional radio frequency transmitter.

It will be appreciated that other selective call radio devices (not shown in FIG. 1), such as one and two way pagers, conventional mobile cellular telephones, mobile radio data terminals, mobile cellular telephones having attached data terminals, or mobile radios (trunked and non-trunked) having data terminals attached, are also able to be used in the radio communication system 100. In the following description, the term "selective call radio" will be used to refer to the personal radio telephone, the portable transmitting/receiving device 106, a mobile cellular telephone, a mobile radio data terminal, a mobile cellular telephone having an attached data terminal, or a mobile radio (conventional or trunked) having a data terminal attached. Each of the selective call radios assigned for use in the radio communication system 100 has an address assigned thereto which is a unique selective call address. The address enables the transmission of a message from the system controller 102 only to the addressed selective call radio, and identifies messages and responses received at the system controller 102 from the selective call radio. Furthermore, each of one or more of the selective call radios also has a unique telephone number assigned thereto, the telephone number being unique within the PSTN 108. A list of the assigned selective call addresses and correlated telephone numbers for the selective call radios is stored in the system controller 102 in the form of a subscriber data base.

Figure 2:
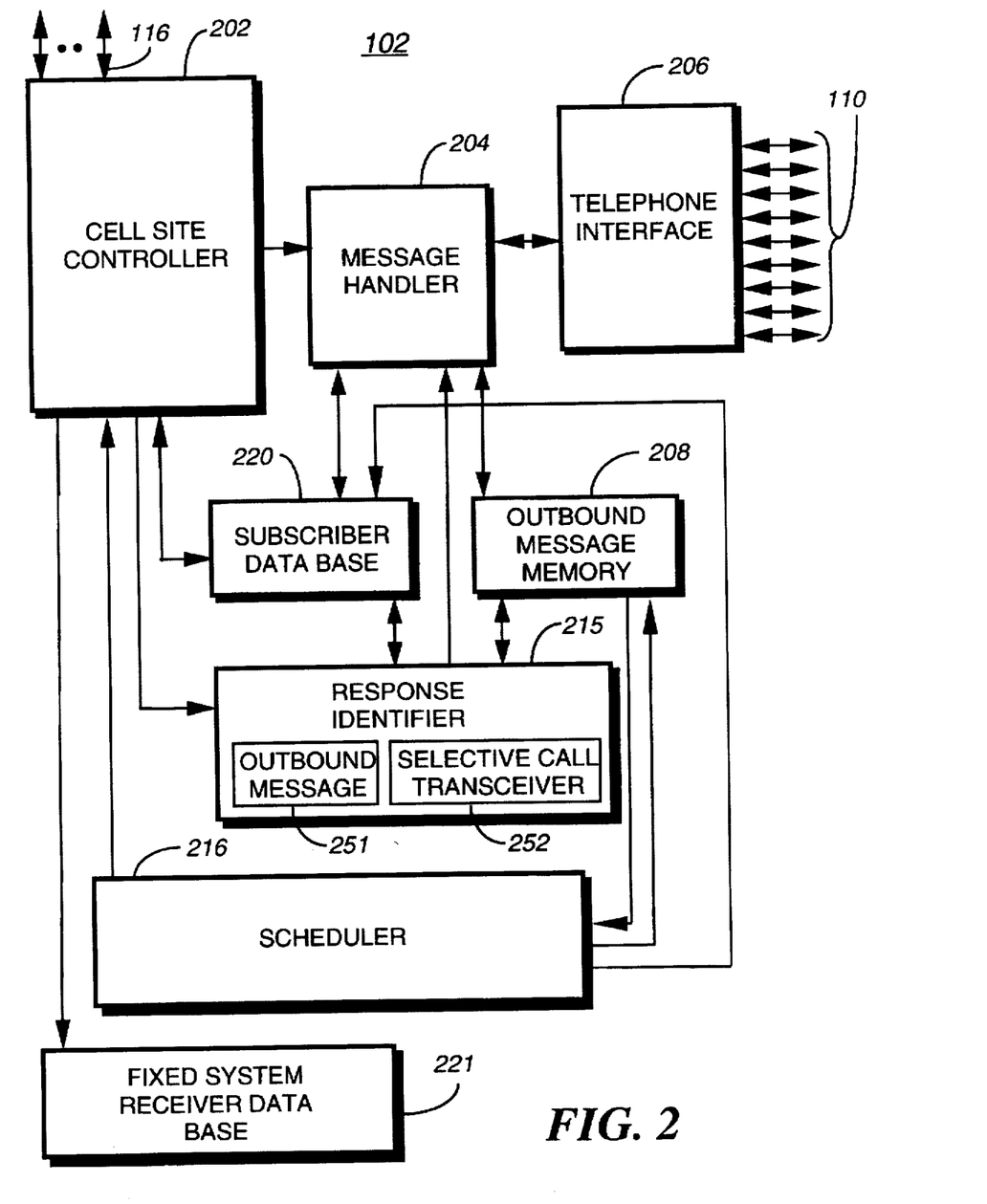
FIG. 2 is an electrical block diagram of a system controller used in the radio communication system, in accordance with the preferred embodiment of the present invention.

Referring to FIG. 2, an electrical block diagram of the system controller 102 is shown, in accordance with the preferred embodiment of the present invention. The system controller 102 comprises a cell site controller 202, a message handler 204, an outbound message memory 208, a subscriber data base 220, a telephone interface 206, a response identifier 215, a fixed system receiver data base 221, and a scheduler 216. The cell site controller 202 is coupled to the radio frequency transmitter/receivers 103 (FIG. 1) and fixed system receivers (FIG. 1) by the links 116. The cell site controller 202 couples outbound messages including selective call addresses to the transmitter/receivers 103 and controls the transmitter/receivers 103 to transmit transmission cycles which include the outbound messages. The cell site controller 202 also processes inbound messages from the selective call radios 106. The inbound messages are received by the transmitter/receivers 103 and fixed system receivers 107, and are coupled to the cell site controller 202. The message handler 204, which routes and processes messages, is coupled to the telephone interface 206, the subscriber data base 220, and the outbound message memory 208. The telephone interface 206 handles the switched telephone network 108 (PSTN) (FIG. 1) physical connection, connecting and disconnecting telephone calls at the telephone links 110, and routing the audio signals between the telephone links 110 and the message handler 204.

The subscriber data base 220 stores information for each subscriber, including a correlation between a selective call address assigned to each selective call radio 106 and the telephone number used within the PSTN 108 to route messages and telephone calls to each selective call radio 106, as well as other subscriber determined preferences, such as hours during which messages are to be held back from delivery to the selective call radio 106. The outbound message memory 208 is for storing a queue of messages which are queued for delivery to at least one of the plurality of selective call radios 106, wherein each message of the queue of messages is associated with a selective call address, also stored in the outbound message memory 208, of one of the plurality of selective call radios 106 for which each message is intended. The scheduler 216, which is coupled to the outbound message memory 208, the cell site controller 202, and the subscriber data base 220, schedules outbound messages and the selective call addresses associated therewith within a transmission cycle. The scheduler also determines response schedules for response messages which minimizes contention of messages at transmitter/receivers 103 and fixed system receivers 107, and includes response timing information in outbound messages so that selective call radios 106 will respond according to the response schedule. The response identifier 215, which is coupled to the cell site controller 202, the subscriber data base 220, the message handler 204, and the outbound message memory 208, comprises a selective call radio element 252 which identifies an inbound message as being a response message associated with one of the selective call radios in the subscriber data base 220 and comprises an outbound message element 251 which identifies the response message as being associated with one of the outbound messages in the outbound message memory 208. The response identifier routes the identified outbound message and the associated response message to the message handler 204 for further processing of the outbound and response messages.

As one example of an operation of the system controller 102, the delivery of an outbound message stored in the outbound message memory 208 is completed when the outbound message has been communicated to the intended selective call radio 106, the message is presented on a display of the selective call radio 106 by a user action, a message response is communicated back to the system controller 102 from the selective call radio 106, and the message response is identified by the outbound message element 251 of the response identifier 215 as being a user acknowledgment generated by the selective call radio 106 specifically for the outbound message. In this example, the message handler 204 generates another message which is sent to the originator of the outbound message to notify the originator that the message has been acknowledged by the selective call radio 106.

In accordance with the preferred embodiment of the present invention, inbound messages are transmitted by the selective call radios 106 at a base, or default, inbound data rate. The base inbound data rate is preferably one of a group of predetermined inbound data rates, the group being eight hundred, sixteen hundred, 6400, or 9600 bits per second. Each of the group of predetermined inbound data rates is associated with a respective predetermined modulation method. The cell site controller 202 receives a signal quality indicator with each inbound message received via the fixed system receivers 107 from subscriber data base 220. The signal quality indicator is determined by a received signal strength indication circuit (RSSI) in the fixed system receiver 107 during the reception of the message, in a manner well known to one of ordinary skill in the art. The cell site controller 202 is coupled to the subscriber data base 220 and stores the signal quality indicator and the time at which it was received in the subscriber data base in the association with the selective call radio 106. Alternative techniques for determining signal quality which are well known to one of ordinary skill in the art, such as a bit error rate of a signal which includes error detecting bits, can be used equally well. The cell site controller 202 also uses the value of the signal quality indicator as well as the values and ages of signal quality indicators obtained from prior inbound messages stored in association with the selective call radio 106 to determine an update to an optimum inbound data rate which is stored in the subscriber data base 220 in association with the selective call radio 106. The optimum inbound data rate is also selected from the group of inbound data rates.

The base inbound data rate is selected, for example, at the time of system installation, in order to optimize characteristics of the system such as cost and coverage using other characteristics such as the number of transmitter/receivers 103 and fixed system receivers 107 in the system as well. The base inbound data rate is included in a portion of the outbound radio signal which is decoded by all selective call radios receiving outbound messages during the transmission cycle, and is used by default in every inbound message transmitted by the selective call radios 106. However, the optimum inbound data rate is also used in at least some portion of some inbound messages, as described in more detail below. It will be appreciated that the optimum inbound data rate for a given selective call radio is, in many instances, greater than the base inbound data rate. When an outbound message is likely to result in an inbound message of a minimum predetermined length (described below), the cell site controller 202 includes in the outbound message the optimum inbound data rate associated with the selective call radio for which the outbound message is intended, which is a unique aspect of the present invention. For example, the optimum inbound data rate for the preferred group of predetermined inbound data rates can be conveyed using two bits in the outbound message, when the preferred group of predetermined inbound data rates consists of four data rates.

In accordance with the preferred embodiment of the present invention, the cell site controller 202 is coupled to the fixed system receiver data base 221 for storing therein a state of a synchronization mode for each fixed system receiver 107 controlled by the system controller 102. As described herein, below, each fixed system receiver 107 is in one of two modes; synchronous or asynchronous. The fixed system receivers 107 of a first type (described below) are always in the asynchronous mode. The fixed system receivers 107 of the second type are normally in the synchronous mode, but may fall back to the asynchronous mode, for example, when a failure occurs in a synchronizing portion of the receiver 107. Such a fall back is reported to the cell site controller 202 by the receiver 107.

The cell site controller 202 further stores in the subscriber data base a fixed system receiver 107 location associated with each selective call radio 106. The location associated with each selective call radio 106 identifies a fixed system receiver 107 which is determined to be the most likely receiver 107 to receive the next inbound messages from the radio 106. The location is determined when a prior response is received from the selective call radio within a predetermined time limit with a predetermined minimum signal quality level. When multiple copies of a response message are received from a selective call radio 106 from multiple fixed system receivers 107, the location is determined by the receiver 107 which indicates the highest signal quality level. When an outbound message for a selective call radio 106 is expected to result in a response message, such as an acknowledgment or an designated response message, the cell site controller 202 recovers from the fixed system receiver data base 221 the synchronous mode of the fixed system receiver 107 associated by the location in the subscriber data base 220 with the radio 106 and includes a preamble indicator which identifies the synchronous mode of the fixed system receiver 107 in the outbound message. When no location for a selective call radio 106 is established, the the synchronous mode of a fixed system receiver 107 identified in the subscriber data base 220 as a default location of the selective call radio 106 is included as the preamble indicator which identifies the synchronous mode of the fixed system receiver 107 in the outbound message. The determination and storage of the synchronous mode of the fixed system receivers 107 and inclusion of the mode indicator in an outbound message are unique aspects of the present invention.

System controller 102 is preferably a model MPS2000® paging terminal manufactured by Motorola, Inc., of Schaumburg Ill., modified with special firmware elements in accordance with the preferred embodiment of the present invention, as described herein. The cell site controller 202, the message handler 204, the telephone interface 206, the outbound message memory 208, the subscriber data base 220, the scheduler 216, and the response identifier 215 are preferably implemented within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 220 and the outbound message memory 208 can alternatively be implemented as magnetic or optical disk memory, which can alternatively be external to the system controller 102.

Figure 3:
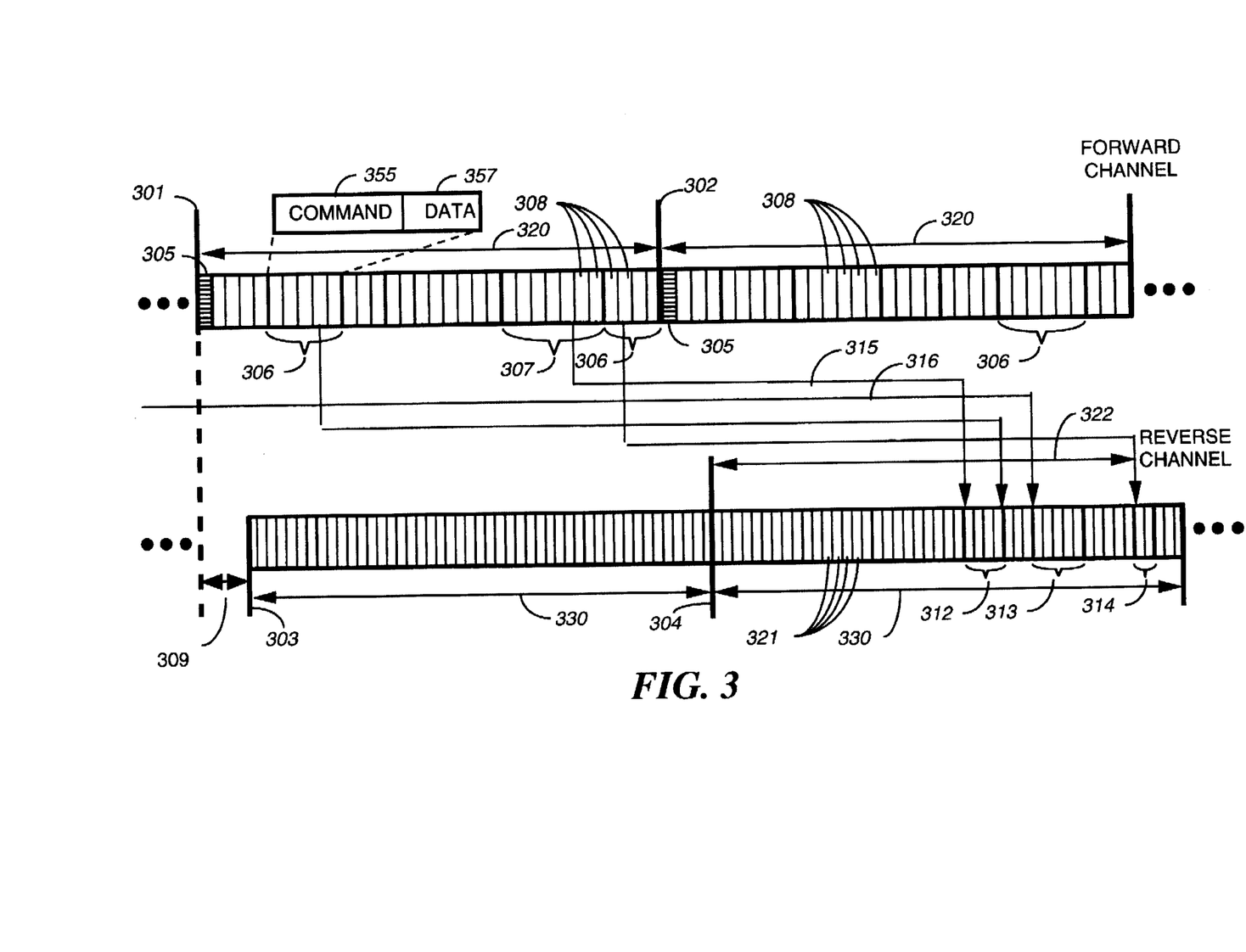
FIG. 3 is a timing diagram showing forward and reverse channel radio signals for the radio communication system, in accordance with the preferred embodiment of the present invention.

Referring to FIG. 3, a timing diagram shows forward and reverse channel radio signals for the radio communication system 100, in accordance with the preferred embodiment of the present invention. The forward channel radio signal, which is transmitted during a forward channel frame 320, is at a first radio carrier frequency. The reverse channel radio signals, which are transmitted during a reverse channel frame 330, are at a second radio carrier frequency.

The forward channel frame 320 duration is from a forward channel frame boundary 301 to a next forward channel frame boundary 302 during which transmissions of a forward channel radio signal are made from the transmitter/receiver 103 to one or more of the identified selective call radios in the first type of radio communication system 100. The forward channel frame boundaries are preferably transmitted at regular intervals of 1.875 seconds and referenced to a first frame boundary of a first transmission cycle occurring accurately at the beginning of each hour, wherein the beginning of each hour is established using a standard time base. Alternative frame durations may be used equally well. The forward channel radio signal comprises one or more sequential radio signals transmitted from the transmitter/receiver 103. A forward channel frame synchronization and information portion 305 and a plurality of outbound messages 306, 307 are transmitted within the forward channel radio signal by the transmitter/receiver 103. The plurality of outbound messages are each made up of a plurality of data words 308 of equal duration which are transmitted using a outbound data rate and associated modulation scheme typically predetermined for the forward channel. In accordance with the preferred embodiment of the present invention, the outbound data rate is sixteen hundred, 3200, or 6400 bits per second (bps) transmitted, and the modulation scheme is two or four level FM. A reverse channel frame 330 duration is from a reverse channel frame boundary 303 to a next reverse channel frame boundary 304 and includes a plurality of predetermined time slots 321 of equal duration which are transmitted using a default, or base inbound data rate and associated modulation scheme. A plurality of response messages are transmitted as data units 312, 313, 314, each data unit comprising a plurality of data symbols and extending over one or more time slots 321. One response message may include one or more such data units. Each of the data units 312, 313, 314 is a radio signal transmitted from one of the identified selective call radios in response to a response command 355 which is received in one of the outbound messages 306, 307.

Each frame synchronization and information portion 305 contains a frame synchronization pattern that marks the forward channel frame boundaries 301, 302, establishes data symbol (data rate) synchronization, and includes information describing the reverse channel offset 309 to the reverse channel frame boundary 303, as a number of reverse channel time slots 321. The start time of each outbound message 306, 307 is defined relative to the forward channel frame boundary 301, for example, by a word number. A command 355 is included in one or more of the outbound messages 306, 307 by the system controller 102, identifying one of the selective call radios by the selective call address associated with the selective call radio in the subscriber data base 220 (FIG. 2), as well as a scheduled response time at which the identified selective call radio is to begin transmitting a data unit in a reverse channel radio signal. The command 355 includes a designated length of the data unit, as a number of time slots 321. The outbound messages 306, 307 also may include data 357, such as a alphanumeric information message. The start time of each data unit 312, 313, 314 is scheduled relative to the next reverse channel frame boundary 304, as for example data unit 314 which is scheduled at a time slot starting after the time slots included in an offset 322.

Synchronization of the forward frame 320, reverse frame 330, word 308, data symbol, reverse channel offset 309, and time slot 321 required by the selective call radios 106 in the radio communication system 100 for both receiving on the forward channel frame and transmitting on the reverse channel frame 330 is determined from the forward channel frame synchronization and information portion 305. When a selective call radio 106 receives the forward channel radio signal, the selective call radio 106 processes the outbound message 306, 307 included in the forward channel radio signal when the outbound message 306, 307 includes the selective call address of the selective call radio 106. When a command 355 is received by a selective call radio 106 which is a response command, the selective call radio 106 having the selective call address associated with the response command transmits, for example one of the scheduled data units 312, 313, 314 having an designated data unit length at the scheduled response time commanded by the system controller 102 in the command 355. Correspondence between the commands 355 received by identified selective call radios in the outbound messages 306, 307 and the scheduled data units 312, 313, 314 from the selective call radios 106 is indicated in FIG. 3 by arrowed lines from outbound messages 306, 307 to the scheduled data units 312, 313, 314, of which an example is line 315, which connects from a command 355 completed in forward message 307 to scheduled response 312. Another example is line 316, which connects from a command 355, not shown in FIG. 3, that is completed in an earlier forward channel frame than the forward channel frames 320 shown in FIG. 3, to the scheduled response 313 in FIG. 3.

Each data unit 312, 313, 314 transmitted from a selective call radio 106 is completely self contained in that it includes all of the information required by the fixed system receiver 107 to detect and decode the scheduled data unit 312, 313, 314. That is, each scheduled data unit 312, 313, 314 includes a synchronization pattern for demodulation and decoding of the data unit, the selective call radio's unique address, and information conveying the transmitted data unit length. In accordance with the preferred embodiment of the present invention, each data unit begins with a first portion which is transmitted at the base inbound data rate, and ends with a second portion which is transmitted at the optimum inbound data rate (it will be appreciated that the optimum inbound data rate may be equivalent to the base inbound data rate). This is described in more detail below.

It will be further appreciated that the radio communication system can alternatively have more than one forward channel in which response commands are sent. For example, one portion of the selective call radios 106 are instructed to receive using a first forward channel radio frequency while a second portion receive using a second forward channel radio frequency. The preferred embodiment of the present invention provides the same or more benefits in these alternative radio communication systems 100.

Figure 4:
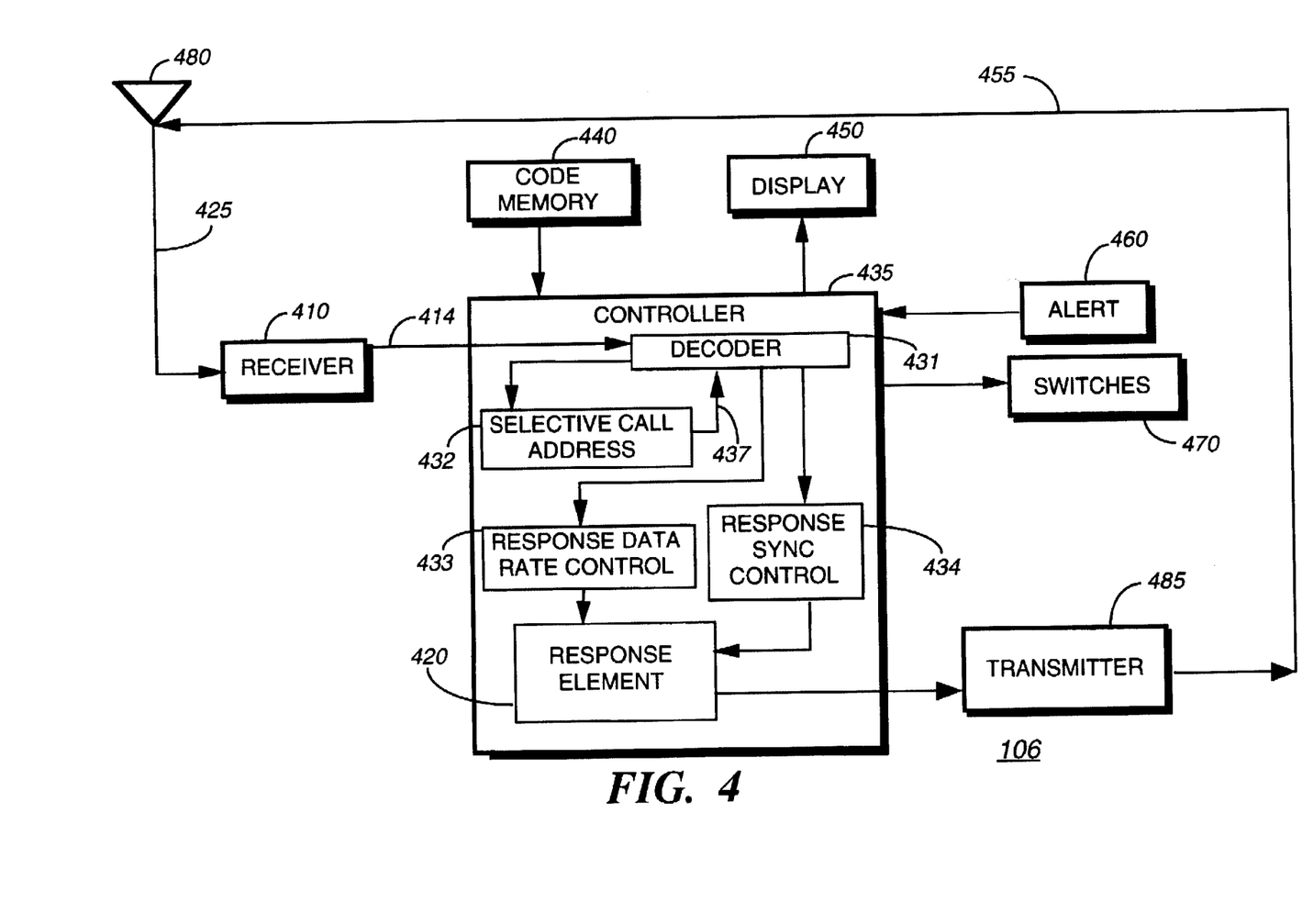
FIG. 4 is an electrical block diagram of a selective call radio with inbound message capability used in the radio communication system, in accordance with the preferred embodiment of the present invention.

Referring to FIG. 4, an electrical block diagram of a selective call radio 106 with inbound message capability is shown, in accordance with the preferred embodiment of the present invention. The selective call radio 106 includes an antenna 480 for intercepting and transmitting radio signals. The intercepted signal 425 in this example is a frame 320 which includes the selective call address of the selective call radio 106 and the outbound message 307 intended for the selective call radio 106. Message 307 includes a response command which commands the selective call radio 106 to respond with a response message which includes information generated at the selective call radio 106, for example, the viewing status of all alphanumeric messages currently in the selective call radio 106 (i.e., whether the alphanumeric messages have been displayed). The antenna 480 is coupled to a conventional receiver 410 and a conventional transmitter 485. The receiver 410 and the transmitter 485 are coupled to a controller 435. The controller 435 is coupled to a code memory 440, a display 450, an alert 460, and a set of switches 470. The intercepted signal 425 is coupled to the receiver 410 wherein the intercepted signal 425 is received, which includes filtering to remove undesirable energy at off channel frequencies, amplification of the filtered signal, and demodulation of the amplified signal. The receiver 410 thereby generates an analog signal 414 which is coupled to a controller 435. It will be appreciated that the signal 414 could alternatively be a signal comprising digital samples of the demodulated received signal, when a digital signal processor is used to demodulate the received signal. The controller 435 comprises a decoder 431, a selective call address element 432, a response data rate control element 433, a response synchronization control element 434, and a response element 420. The analog signal 414 includes the information transmitted in the frame 320 in the form of data symbols, including the message 307, with errors possibly induced during the radio communication of the signal. The decoder 431 recovers bits from the data symbols received at the predetermined outbound data rate in the analog signal 414 and performs decoding of the binary information, for recovering portions of the frame including the default inbound data rate indication, the selective call addresses, and the outbound message 307 using error correction and detection techniques well known to one of ordinary skill in the art. The controller 435 is coupled to a code memory 440, in which is stored at one or more addresses assigned to the selective call radio 106, such as a local address (used in a "home" portion of the radio communication system 100), a "roaming" address (used in other portions of the radio communication system 100), and a group address (shared with other "home" selective call radios 106). The assigned address(es) are also referred to herein as the embedded addresses. When the controller 435 determines that a portion of the frame which includes the selective call address is sufficiently error free, the controller 435 couples the portion of the frame which includes the selective call address to the selective call address element 432 which compares each outbound selective call address in the frame 320 to the embedded addresses. When none of the outbound selective call addresses in the recovered frame 320 match any embedded selective call address, the controller 435 ceases further processing of the analog signal 414 and puts the selective call radio 106 into a power down mode until a later time when a subsequent frame 320 is transmitted which potentially includes outbound messages for the selective call radio 106. When any outbound selective call address in the recovered frame 320 and an embedded selective call address do match, the selective call address element 432 generates a message received signal 437 which is coupled to the decoder 431. In response to the message received signal 437, the decoder 431 continues processing the frame 320 by recovering the position of the outbound message 307 within the frame, from the frame synchronization and information portion 305. Using the position, the decoder 431 then processes the outbound message 307. When the decoder 431 determines that the outbound message 307 is sufficiently error free and the outbound message 307 includes user related information, such as an alphanumeric message, the controller 435 generates a user alert signal.

The controller 435 is coupled to a set of switches 470, to which the controller 435 is responsive for setting and controlling a plurality of operational modes of the selective call radio 106. Depending on the operational mode of the selective call radio 106, and depending on the contents of the outbound message, the controller 435 couples information included in the outbound message to a display 450 for presentation and stores information included in the outbound message for later presentation. Also depending on the operational mode of the selective call radio 106, a sensible alert device 460, for example, a tone alert device or a vibration alert device, is activated in response to the alert signal.

In this example, upon determining that the outbound message 307 includes a response command, the decoder 431 couples the outbound message 307 to the response data rate control element 433 and to the response synchronization control element 434. The response data rate control element 433 determines an optimum inbound data rate from information included by the system controller 102 in the outbound message 307. The response synchronization control element 434 determines a synchronous mode from information included by the system controller 102 in the outbound message 307. A response message data unit 312 which includes at least a portion of the required response information (such as a list of displayed messages) is encoded by the response element 420 under control of the response data rate control element 433 and response synchronization control element 434. When no optimum data rate is determined from information in the message 307, the response message data unit 312 is encoded entirely at the base inbound data rate. When an optimum data rate is determined from the outbound message 307, the response data rate control element 433 controls the response element 420 to generate a first portion 610 (FIG. 6) of the response message data unit 312 at the base data rate and a second portion 620 (FIG. 6) of the response message data unit 312 at the optimum data rate, including an information in the first portion 610 (FIG. 6) which indicates which of the predetermined inbound data rates is the optimum inbound data rate. When the mode is determined from the preamble indicator in the outbound message 307 to be the asynchronous mode, the response synchronization control element 434 controls the response element 420 to generate the first portion 610 (FIG. 6) of the response message data unit 312 including a synchronizing packet, whereas, when the mode is determined to be the synchronous mode, the response synchronization control element 434 controls the response element 420 to generate the first portion 610 (FIG. 6) of the response message data unit 312 without the synchronizing packet. The response message data unit 312 is coupled from the response element 420 to the transmitter 485, which generates an RF transmit signal 455. The RF transmit signal 455 is coupled to the antenna 480 and transmitted.

The receiver 410 in accordance with the preferred embodiment of the present invention in FIG. 4 is preferably a conventional triple conversion receiver of a type well known to those skilled in the art, but can alternatively be a conventional single conversion or conventional zero intermediate frequency (ZIF) receiver. The code memory 440 is conventional EPROM, or conventional SRAM or another conventional memory type which is well known to those skilled in the art. The display 450 is an LCD display of a type well known to those skilled in the art, and the antenna 480, switches 470, and alert device 460 are devices also well known to those skilled in the art. The controller 435 is preferably implemented within a controller section which includes, but is not limited to conventional hardware circuits including a microprocessor, timing circuits, random access memory, non-volatile memory such as EPROM, and input/ output circuitry. The unique functions of the response data rate control element 510 and the response synchronization control element 515 described herein are controlled by unique firmware routines developed in accordance with techniques well known to one of ordinary skill in the art. The microprocessor is preferably one of the 68HC05 family microprocessors made by Motorola, Inc. of Schaumburg, Ill. The transmitter 485 is a conventional low power transmitter of a type well known to those skilled in the art.

Figure 5:
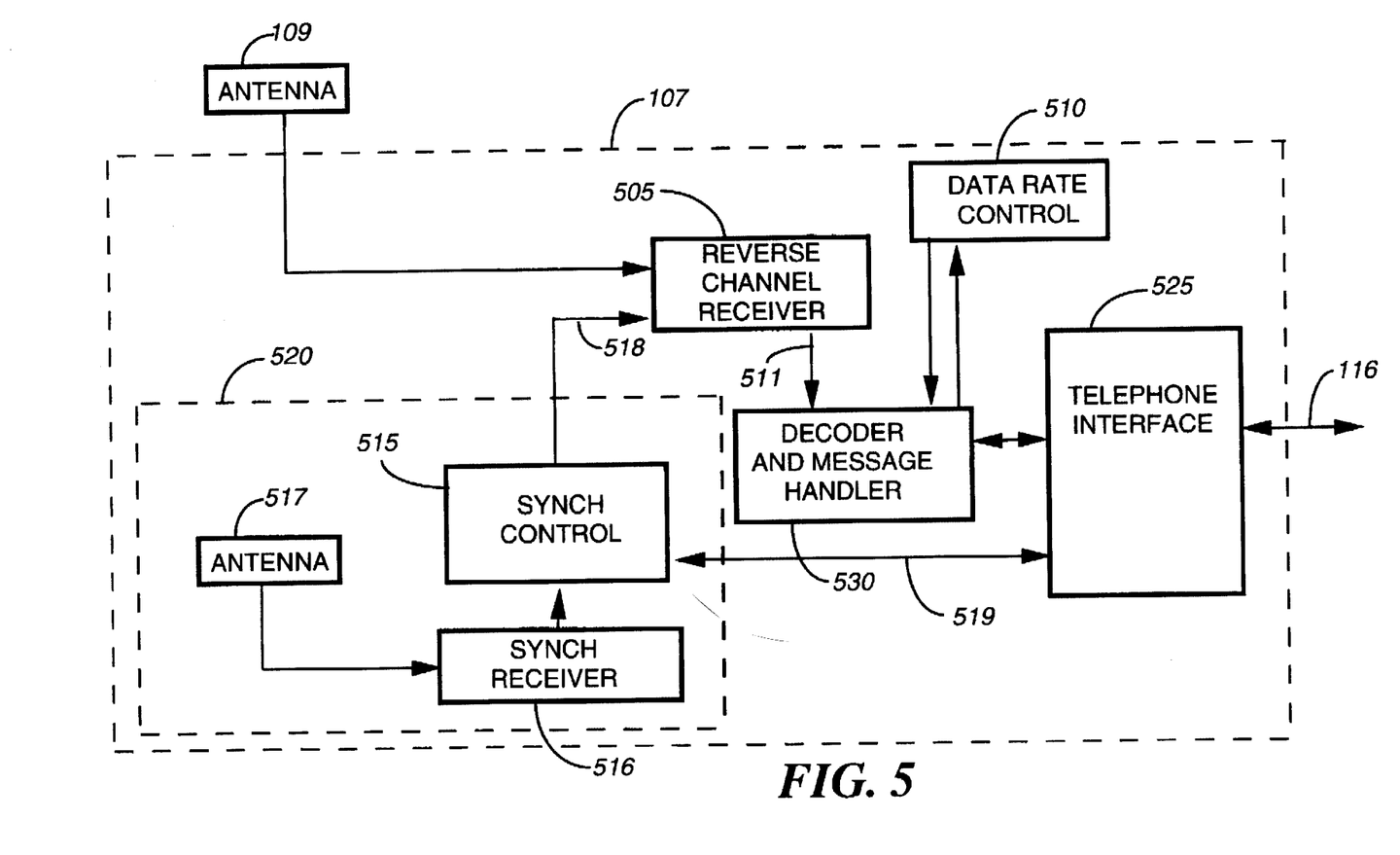
FIG. 5 is an electrical block diagram of a fixed receiver and antenna used in the radio communication system, in accordance with the preferred embodiment of the present invention.

Referring to FIG. 5, an electrical block diagram of the fixed receiver 107 and antenna 109 is shown, in accordance with the preferred embodiment of the present invention. In accordance with the preferred embodiment of the present invention, a first type of fixed receiver 107 comprises a reverse channel receiver 505, which is a radio frequency (RF) receiver operating at the second radio carrier frequency for receiving reverse (inbound) radio channel signals from selective call radios 106, a data rate control element 510, a telephone interface 525, and a decoder and message handler element 530. A second type of fixed receiver 107 further comprises a synchronization section 520. The antenna 109 is coupled to an RF input of the reverse channel receiver 505. The reverse channel receiver 505 operates to amplify, filter, and convert a reverse channel radio signal intercepted by the antenna 109, generating an intermediate frequency (IF) signal which is demodulated and coupled to the decoder and message handler element 530 as an analog signal 511 which includes data symbols. The decoder and message handler element 530 recovers bits from the data symbols in the analog signal 511 and performs error detection and correction decoding of the binary information, recovering the inbound data unit 313. The decoder and message handler element 530 is coupled to the telephone interface 525 and the data rate control element 510. The decoded data unit 313 is transferred to the telephone interface 525 for communication to the system controller 102 via the communication link 116. An output of the data rate control element 510 is coupled to the decoder and message handler element 530 to control a data rate at which the reverse channel receiver 505 demodulates the IF signal. When the fixed system receiver 107 receives the inbound message 312 from the selective call radio 106, the data rate control element 510 controls the decoder and message handler element 530 to synchronize to the response message data unit 312 and begin decoding the response message data unit 312 using the base, or default, inbound data rate. The reverse channel receiver 505 achieves synchronization during the first portion 610 (FIG. 6) of the inbound message with a precision sufficiently high such that the fixed system receiver 107 (reverse channel receiver 505 and decoder and message handler 530) are also synchronized with the highest data rate (9600 bps) of the group of inbound data rates. The data rate control element 510 decodes the optimum data rate from information included in the first portion 610 (FIG. 6) of the response message data unit 312. The data rate control element 510 then controls the decoder and message handler 530 to decode the second portion 620 (FIG. 6) of the response message data unit 312 at the optimum data rate.

Referring again to FIG. 5, in the second type of fixed system receiver 107, the synchronization section 520 comprises an antenna 517 coupled to a synchronization receiver 516, which in turn is coupled to a synchronization control element 515. The reverse channel receiver 505 is operated in one of two synchronization modes; asynchronous and synchronous. When operating in the synchronous mode, an output 518 of the synchronization section 520 is coupled to the reverse channel receiver 505 to acquire symbol recovery timing and synchronize the fixed system receiver 107 to data packet boundaries 622 of the response message data unit 312, which actions are necessary to operate the fixed system receiver 107 synchronously with the inbound radio signals sent by the selective call radios 106, and which, as described above with reference to FIG. 3, are also synchronized to the forward channel. The synchronization which is necessary to operate reliably in the synchronous mode is reverse channel frame boundary 303, 304, data rate (data symbol), and time slot 321 synchronization which is acquired from the synchronizing receiver 516. Because data packets 321 are initiated at the beginning of time slots, time slot 321 synchronization also provides response message data unit 312 and data packet 621 (FIG. 6) synchronization. The synchronizing receiver 516 is either an RF receiver for receiving the forward channel radio frequency or a standard time reference receiver, such as a Global Positioning Satellite receiver, for obtaining synchronization to the same standard time base used for the forward channel. When the synchronizing receiver 516 is an RF receiver for receiving the forward channel radio frequency, the synchronization control element 515 recovers forward channel frame boundary 301, 302, symbol, and word synchronization, and reverse channel offset from the forward channel frame synchronization and information portion 305. The synchronization control element 515 derives reverse frame boundary 303, 304, and time slot 321 synchronization from the forward channel synchronization information and a predetermined time slot duration. When the synchronizing receiver 516 is a standard time reference receiver, it recovers a highly accurate standard time and derives the reverse frame boundary 303, 304, and time slot 321 synchronization from the standard time reference, a predetermined time slot duration, and a default reverse channel offset which is preferably communicated from the system controller 102, at the time of system installation or during a system service operation, from the system controller 102 via the communication link 116 to the telephone interface 525, where it is transferred to the message handler element 530 which routes it to the synchronization control element 515. Alternatively, the default reverse channel offset can be manually set by switches (not shown) within the fixed system receiver 107. The second type of fixed system receiver 107 preferably operates in the synchronous mode. If reception of synchronizing information is lost in the second type of fixed system receiver 107, the synchronization control element 515 generates an alert message which is routed by the decoder and message handler element 530 to the system controller 102 for appropriate action, which may include servicing the fixed system receiver 107.

In accordance with the preferred embodiment of the present invention, when the fixed system receiver 107 is a second type of receiver 107 operating in the synchronous mode, the receiver 107 establishes a precise synchronization with the forward channel as transmitted by the transmitter/receivers 103, so that when an inbound message data unit 312 is received from a selective call radio 106, the fixed system receiver 107 is already synchronized to data packet boundaries 622 (FIG. 6) within the inbound message data unit 312 and need only make, at most, a small modification to an established symbol synchronization to account for variations which occur between the selective call radios 106 and the forward channel. It will be appreciated that the forward channel is very precisely synchronized to standard time by highly accurate time base references, such as the GPS system or oven controller time bases. However, there are small variations of symbol synchronization from one selective call radio 106 and another selective call radio 106 caused by the radio propagation delays inherent when different distances are involved from a transmitter/receiver 103, to a selective call radio, and further from the selective call radio 106 to the fixed system receiver 107, in comparison to the respective distances to another selective call radio 106. There also exist small variations from one selective call radio 106 and another selective call radio 106 in oscillator references within the selective call radios 106 which require a small adjustment to the symbol recovery timing in a fixed system receiver 107 when receiving an inbound message data unit 312 from a selective call radio 106. The small adjustments to correct for distance and oscillator differences are accomplished by a short symbol synchronization adjustment segment of the first portion 610 (FIG. 6) of the response message data unit 312, which is described in more detail below.

When the fixed system receiver 107 is a first or second type and is operated in the asynchronous mode, the receiver 107 requires a synchronization signal which is long enough to establish data unit 312, data packet 625, 650, 660 (FIG. 6), and data rate (data symbol) synchronization. Data unit synchronization includes acquiring symbol recovery timing and synchronizing the fixed system receiver 107 to data packet boundaries 622 (FIG. 6) of the response message data unit 312. As described above, a synchronization packet is included by the selective call radio 106 in an inbound message data unit intended for a fixed system receiver 107 which is operating in the asynchronous mode.

The default data rate is preferably established in the fixed system receiver 107 of the first or second type by a command message transmitted from the system controller 102 to the fixed system receiver 107 via the communication link 116, but alternative techniques can be used, such as a factory setting. In the second type of fixed system receiver 107, wherein the synchronizing receiver 516 receives forward channel information, the default data rate can alternatively be obtained from the forward channel information.

In accordance with the preferred embodiment of the present invention, the first type of fixed system receiver 107 is preferably a Nucleus® model receiver manufactured by Motorola, Inc. of Schaumburg, IL., with unique functions added to the standard model. The reverse channel receiver is the conventional receiver section of the Nucleus® model receiver. The data rate control element 510 and the decoder and message handler element 530 are implemented within the Nucleus® model receiver in a controller section which includes, but is not limited to a conventional hardware circuits including a microprocessor, timing circuits, random access memory, non-volatile memory such as EPROM, and input/output circuitry. The unique functions of the data rate control element 510 and the decoder and message handler element 530 described herein are controlled by unique firmware routines developed in accordance with techniques well known to one of ordinary skill in the art. The telephone interface 525 and reverse channel receiver 505 are of conventional type.

In accordance with the preferred embodiment of the present invention, the second type of fixed system receiver 107 is implemented using the first type of fixed system receiver 107 and a synchronizing receiver 516 which is a second conventional receiver section of a Nucleus® model receiver. The unique synchronization control element 515 is, like the data rate control element 510 and the decoder and message handler element 530, implemented in the controller section of the Nucleus® model receiver by additional unique firmware. The antenna 109 and antenna 517 is preferably the same conventional radio antenna coupled by a conventional splitter to the reverse channel receiver 505 and the synchronizing receiver 516, when the forward and reverse channels are within one frequency band. When a GPS receiver is used as the synchronizing receiver 516, the antenna 517 is preferably separate from the antenna 109, to optimize the respective intercepted signal strengths.

Alternatively, in some systems and with an appropriate choice of data symbol modulation and data rate, no adjustment segment 612 (FIG. 6) is included in the first portion 610 (FIG.) of the synchronous header 660. Minor symbol synchronization adjustments in the fixed system receiver 107 are determined by high speed analysis of transitions and signal levels found between and within data symbols, which are well known to one of ordinary skill in the art. In this alternative case, when the fixed system receiver is operating in the synchronous mode, the differences between the symbol timing in the selective call radio 106 and the fixed system receiver 107, are small enough that recovery of all bits after the ramp up segment 611 (FIG. 6) is sufficiently reliable to attain a desired signalling sensitivity specification.

Figures 6, 7:
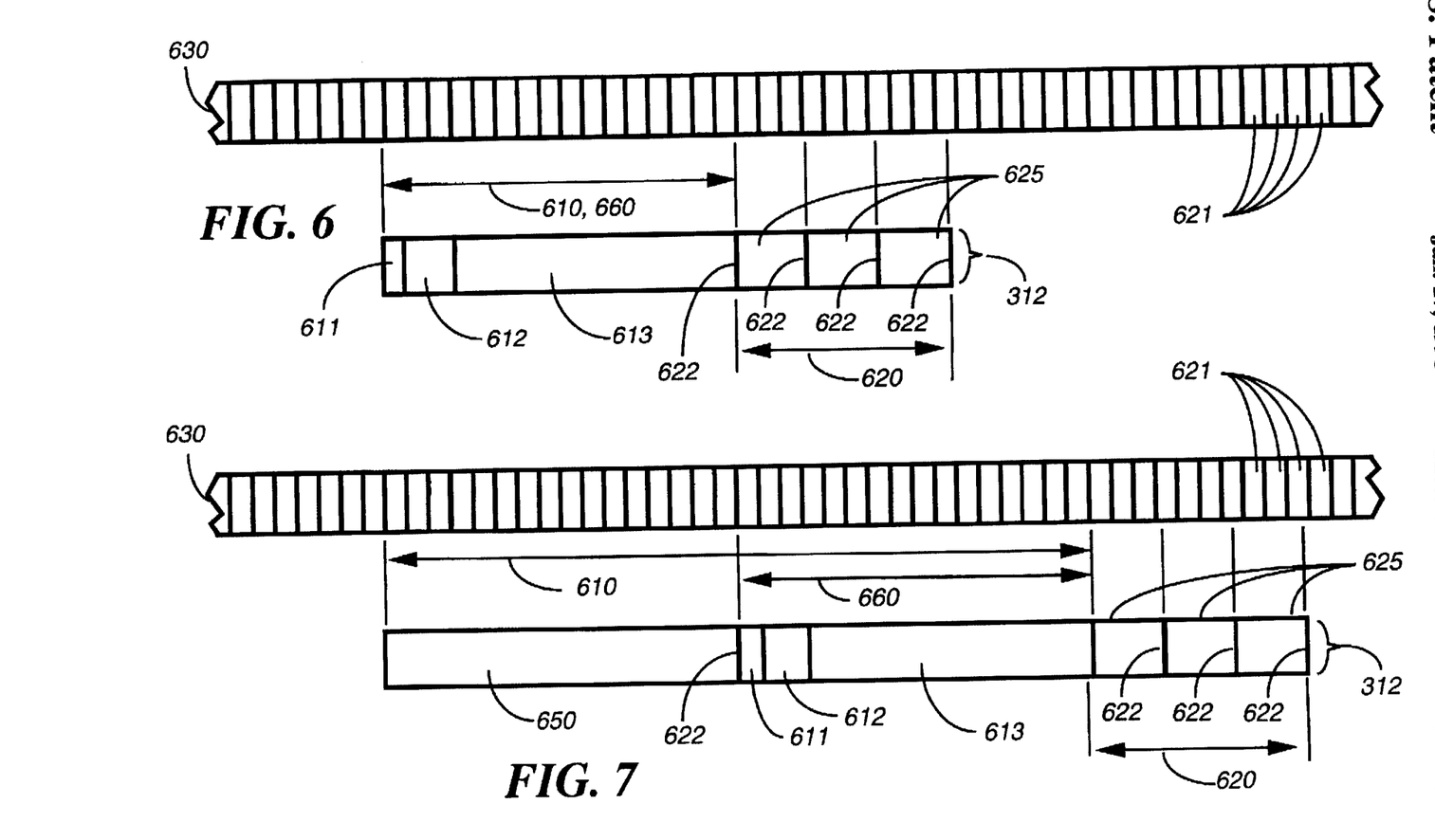
FIGS. 6 and 7 are two timing diagrams of a response message, in accordance with the preferred embodiment of the present invention.

Referring to FIGS. 6 and 7, two timing diagrams of the response message data unit 312 are shown in accordance with the preferred embodiment of the present invention. A portion 630 of the reverse channel frame 330 comprises a plurality of time slots 621, which in this example are shorter and more numerous than indicated in the illustration of FIG. 3. The time slots 621 are exactly 5 milliseconds (msec) long in this example. Each time slot is uniquely identifiable in an outbound message for indicating when a transmission of a response message data unit 312, 313, 314 is scheduled to begin. The data unit 312 comprises a first portion 610 modulated at the default data rate and a second portion 620 modulated at the optimum data rate. The first portion includes a synchronous header data packet 660. The synchronous header data packet 660 includes a transmitter ramp up segment 611, a symbol synchronization adjustment segment 612, and an information and error control segment 613. The second portion includes three data packets 625, which are information packets. Information which indicates the optimum data rate is included in the information and error control segment 613. The data unit 312 in FIG. 7 has a synchronization preamble packet 650 included in the first portion 610. The packets 625, 650, 660 are transmitted consecutively, and have boundaries 622 which define the beginning and end of each packet 625, 650, 660. The fixed system receiver 107 must be synchronized to the boundaries 622 in order to reliably receive and decode the packets 625, 650, 660. In accordance with the preferred embodiment of the present invention, each packet 625, 650, 660 is transmitted at one of four predetermined data rates described above, which are eight hundred, sixteen hundred, sixty four hundred, and ninety six hundred bps. Associated with the predetermined data rate of the packets 625, 650, 660 are respective predetermined packet lengths of one hundred twenty eight, one hundred twenty eight, one hundred fifty four, and one hundred fifty four bits. The respective packet durations are one hundred sixty, eighty, 24.0625, and 16.0417 msec. Of the one hundred twenty eight bits in a synchronous header packet 660 having a data rate of eight hundred or sixteen hundred bps, six bits are allocated for the transmitter ramp up segment 611, during which modulation is typically not transmitted; eighteen bits are allocated for the predetermined symbol synchronization adjustment segment 612; and one hundred four bits are allocated for information and error control segment 613. Thus, the respective bit lengths of the transmitter ramp up segment 611, the predetermined symbol synchronization adjustment segment 612, and the information and error control segment 613 are six bits, eighteen bits, and one hundred four bits. The preferred bit pattern for the eighteen bit predetermined symbol synchronization adjustment segment 612 is 000000000010101000, although alternative patterns which are no more than 22 bits long can be used with nearly equal effectiveness, in which case the length of the packets 625, 650, and 660 are one hundred thirty two bits, and the durations of the packets 625, 650, and 660 are affected proportionately. Of the one hundred fifty four bits in a synchronous header packet having a data rate of 6400 or 9600 bps, six bits are allocated for the transmitter ramp up segment 611, during which modulation is typically not transmitted; eighteen bits are allocated for a predetermined symbol synchronization adjustment segment 612; and one hundred four bits are allocated for the information and error control segment 613. Thus, the respective bit lengths of the transmitter ramp up segment 611, the predetermined symbol synchronization adjustment segment 612, and the information and error control segment 613 are twenty six bits, twenty four bits, and one hundred four bits. The preferred bit pattern for the twenty four bit predetermined symbol synchronization adjustment segment 612 is 000000000010100010001010, although alternative patterns can be used with nearly equal effectiveness. The preferred bit pattern for the one hundred twenty eight or one hundred fifty four synchronization preamble packet 650 is a pseudo random pattern generated by an eight bit generator, ending with seven consecutive 1's, which is well known to one of ordinary skill in the art. Many other patterns well known to one of ordinary skill in the art and selected to provide both symbol and boundary synchronization are alternatively usable for the synchronization preamble packet 650.

Referring again to FIG. 6, a timing diagram is shown of the response message data unit 312. In this example, information is formulated by the selective call radio 106 for inclusion in the response message data unit 312 which requires four data packets. The default or basic data rate determined from the frame synchronization and information portion 305 is sixteen hundred bps. Within the outbound message 307 received by the selective call radio 106 which initiated the response message data unit 312, two optimum data rate indicator bits were received which indicated that the data units of the response message should be transmitted at an optimum data rate which is the highest data rate, 9600 bps, and the preamble indicator bit indicated that the response message is expected to be received at a fixed system receiver 107 of the second type which is operating in the synchronous mode. Accordingly, the selective call radio 106 formulates the response message data units 312 to have a first portion 610 sent at the base data rate, which has a sixteen hundred bps synchronous header data packet 660 which is eighty msec. long, or sixteen time slots 321, and with three 9600 bps data packets 625 in the second portion 620 of the response message data units 312 which are each 16.0417 msec. long, or slightly more than three time slots 321.

Referring again to FIG. 7, a timing diagram is shown of the response message data unit 312. In this second example, the same information is formulated by the selective call radio 106 for inclusion in the response message data unit 312, requiring four data packets. The basic data rate and optimum data rate are the same as illustrated in FIG. 6. Within the outbound message 307 received by the selective call radio 106 which initiated the response message data unit 312 the preamble indicator bit indicated that the response message is expected to be received at a fixed system receiver 107 of the first or second type which is operating in the asynchronous mode. Accordingly, the selective call radio 106 formulates the response message data unit 312 to have a first portion 610 which includes two sixteen hundred bps packets 650, 660 which are eighty msec., or sixteen time slots 321 long: a synchronization preamble packet 650 and the synchronous header data packet 660. The three 9600 bps data packets 620 in the second portion 620 of the response message data unit 312 are each 16.0417 msec. long.

It will be appreciated that the present invention is fully compatible with other data packet bit lengths and modulations. For example, data rates of 800, 1600, 3200, 6400, and 12800 could alternatively be used, all having data packets 196 bits long. Two primary issues in selecting data packet rates are available radio channel bandwidth and reliable coverage.

In accordance with an alternative embodiment of the present invention, the synchronization packet 650 is not as long as the other packets 625, 660. The synchronization is shortened to a packet of minimum length which allows the fixed system receiver to acquire data unit, and packet boundary 622 synchronization, and data rate synchronization, such as a pseudo random sequence of bit length 64 bits, ending in a predetermined pattern, such as seven 1's. While this synchronization packet 650 is shorter, it is inconsistent the other packet lengths and is therefore somewhat more complicated to generate in the selective call radio, and can be more complicated for the central controller 102 to schedule along with other reverse channel scheduled responses of standard packet lengths.

Figure 8:
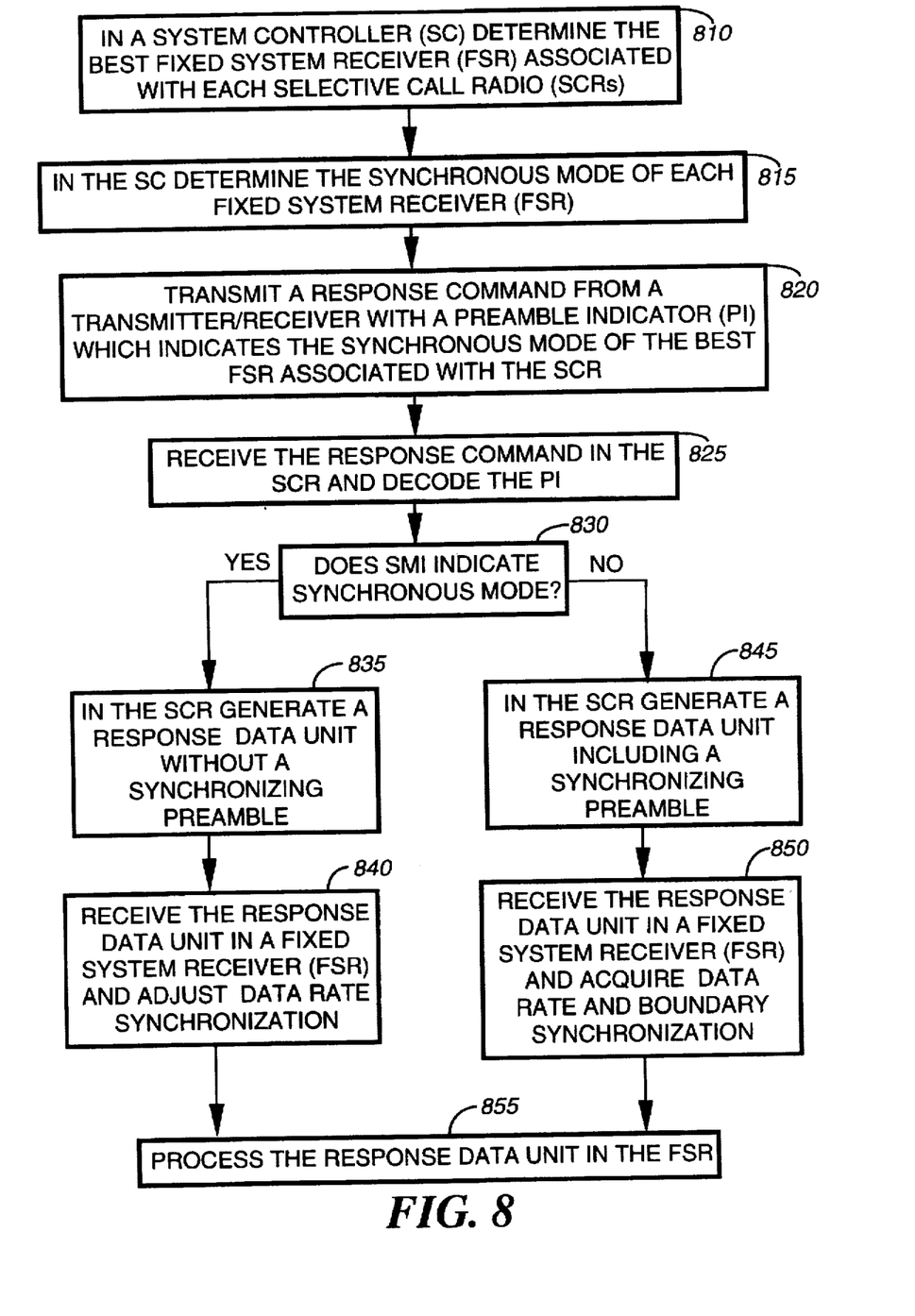
FIG. 8 is a flow chart of a method for synchronizing a fixed system receiver to a response message, in accordance with the preferred embodiment of the present invention.

Referring to FIG. 8, a flow chart of a method for optimizing the synchronization of the fixed system receiver 107 used in the radio communication system 100 is shown, in accordance with the preferred embodiment of the present invention. At step 810, a best fixed system receiver 107 is determined for each selective call radio 106 by the cell site controller 202, which stores the best fixed system receiver in the subscriber data base of the system controller 102 (CC), in a manner described above with reference to FIG. 2. The best fixed system receiver associated with a selective call radio is alternatively described as the fixed system receiver location of the selective call radio 106. The cell site controller 202 further determines the synchronous mode of each fixed system receiver 107 at step 810, and stores the synchronous mode in the fixed system receiver data base 221. When an outbound message 307 which requires a response message 312 is transmitted to a selective call radio 106, the cell site controller 202 includes a preamble indicator (PI), which is an indication of the synchronous mode of the best fixed system receiver 107 associated with the selective call radio 106 for which the outbound message 307 is intended. The transmitter/receiver 103 transmits the outbound message 307 at step 820. The selective call radio 106 (SCR) receives the outbound message 307, which is a response command, and decodes the PI at step 825. When the PI indicates the asynchronous mode at step 830, the SCR generates a response message data unit 312 at step 845 which includes a synchronous preamble 650 which is one data packet long for the data unit 312. When the PI indicates the synchronous mode at step 830, the SCR generates a response message data unit 312 at step 835 which does not include the synchronous preamble the data unit 312. When a fixed system receiver is operating in the asynchronous mode and receives the response message data unit 312 which includes the synchronous preamble 650, the fixed system receiver 107 synchronizes its decoder at step 850 by acquiring symbol recovery timing and synchronizing the fixed system receiver to data packet boundaries 622 of the the response message data unit 312. When a fixed system receiver is operating in the synchronous mode and receives the response message data unit 312 which does not include the synchronous preamble 650, the fixed system receiver 107 adjusts its symbol recovery timing at step 840 using a short synchronization pattern 612 included in the header packet of the response message data unit 312. When the fixed system receiver 107 is synchronized by one of the two methods described above, the fixed system receiver 107 processes the response data unit 312 by communicating the response data unit 312 to the system controller 102, at step 855.

It will be appreciated that the unique synchronizing mode technique described above allows the use of fixed system receivers 107 of the first type in a radio communication system 100 which can also have fixed system receivers 107 of the second type, or which has none of the second type but can later be equipped with fixed system receivers 107 of the second type. This allows installation of a radio communication system 100 using fixed system receivers 107 of the first type, when system loading is low, followed by gradual upgrade to the second type as system loading increases, while optimizing the throughput on the reverse channel by keeping messages as short as possible when a response message is being sent to a fixed system receiver of the second type operating in the synchronous mode. This approach to reducing the length of inbound message data units is much more economical than requiring fixed system receivers of the second type at the onset of a system installation.

We claim:

1. A method used in a radio communication system optimizes a fixed system receiver synchronization, wherein the radio communication system has a fixed system receiver which operates in a synchronization mode which is one of a synchronous mode and an asynchronous mode, and wherein a response message data unit having a synchronous header data packet is transmitted by a selective call radio and received by the fixed system receiver, and wherein in a system controller the method comprises the step of
transmitting a response command which includes a preamble indicator corresponding to the synchronization mode of the fixed system receiver, and wherein in a selective call radio the method comprises the steps of
receiving and decoding the response command including the preamble indicator;
generating the response message data unit, wherein the synchronous header data packet is preceded by a synchronizing packet when the preamble indicator indicates the asynchronous mode and is not preceded by the synchronizing packet when the preamble indicator indicates the synchronous mode; and
transmitting the response message data unit, and wherein in the fixed system receiver the method comprises the steps of
acquiring symbol recovery timing and synchronizing the fixed system receiver to data packet boundaries of the response message data unit, using the synchronizing packet, when the fixed system receiver is in the asynchronous mode and the synchronizing packet and synchronous header are received; and
receiving the response message data unit.

2. The method according to claim 1, wherein in the system controller the method further comprises the step of determining the synchronization mode of the fixed system receiver by a message transmitted therefrom.

3. The method according to claim 1, wherein in the fixed system receiver the method further comprises the step of adjusting the symbol recovery timing of the fixed system receiver, using the synchronous header data packet, when the fixed system receiver is in the synchronous mode and the synchronous header data packet is received and the synchronizing packet is not received.

4. The method according to claim 1, wherein the synchronous header data packet and the synchronizing packet have a common data rate and a common bit length.

5. The method according to claim 4, wherein the common data rate is one of a group of data rates consisting of 800, 1600, 6400, and 9600 bits per second, and wherein the common bit length is one of a respective group of bit lengths consisting of 128, 128, 154, and 154 bits.

6. A method used in a selective call radio optimizes a fixed system receiver synchronization, wherein the selective call radio operates in a radio communication system, and wherein the radio communication system has a fixed system receiver which operates in a synchronization mode which is one of a synchronous mode and an asynchronous mode, and wherein a response message data unit having a synchronous header data packet is transmitted from the selective call radio to the fixed system receiver, and wherein the method comprises the steps of:

receiving a response command which includes a preamble indicator corresponding to the synchronization mode of the fixed system receiver;
decoding the preamble indicator;
generating the response message data unit, wherein the synchronous header data packet is preceded by a synchronizing packet when the preamble indicator indicates the asynchronous mode and is not preceded by the synchronizing packet when the preamble indicator indicates the synchronous mode; and
transmitting the response message data unit.

7. The method according to claim 6, wherein the synchronous header data packet and the synchronizing packet have a common data rate and a common bit length.

8. The method according to claim 7, wherein the common data rate is one of a group of data rates consisting of 800, 1600, 6400, and 9600 bits per second, and wherein the common bit length is one of a respective group of bit lengths consisting of 128, 128, 154, and 154 bits.

9. A selective call radio for use in a radio communication system optimizes a fixed system receiver synchronization, wherein the radio communication system has a fixed system receiver which operates in a synchronization mode which is one of a synchronous mode and an asynchronous mode, and wherein a response message data unit having a synchronous header data packet is transmitted from the selective call radio to the fixed system receiver, wherein the selective call radio comprises:

a receiver for receiving a selective call address associated with a response command which includes a preamble indicator corresponding to the synchronization mode of the fixed system receiver;
a decoder element coupled to said receiver for recovering the selective call address;
a selective call address element coupled to said decoder element for generating a message received signal when the selective call address compares to an embedded address stored in said selective call radio, and wherein said decoder element is responsive to said message received signal for recovering the response command;

a response synchronization control element coupled to said decoder element for decoding the preamble indicator;

a response element coupled to said response synchronization control element for generating, in response to the preamble indicator, the response message data unit, wherein the synchronous header data packet is preceded by a synchronizing packet when the preamble indicator indicates the asynchronous mode and is not preceded by the synchronizing packet when the preamble indicator indicates the synchronous mode; and a transmitter coupled to said response element for transmitting the response message data unit.

10. The selective call radio according to claim 9, wherein said response element generates the synchronous header data packet and the synchronizing packet with a common data rate and a common bit length.

11. The selective call radio according to claim 10, wherein the common data rate is one of a group of data rates consisting of 800, 1600, 6400, and 9600 bits per second, and wherein the common bit length is one of a respective group of bit lengths consisting of 128, 128, 154, and 154 bits.

* * * * *